United States Patent

Freeman et al.

[15] 3,678,469

[45] July 18, 1972

[54] UNIVERSAL CYCLIC DIVISION CIRCUIT

[72] Inventors: Richard B. Freeman, Cary; Michael T. Kawalec, Chapel Hill; Andrew W. Maholick; Stanley R. Stager, III, both of Raleigh, all of N.C.

[73] Assignee: International Business Machines Corporation, Armonk, N.Y.

[22] Filed: Dec. 1, 1970

[21] Appl. No.: 94,070

[52] U.S. Cl.....................................340/172.5, 340/146.1 AL

[51] Int. Cl.....................G08c 25/00, H04l 1/10, G08b 29/00

[58] Field of Search....................................340/146.1, 172.5

[56] References Cited

UNITED STATES PATENTS

| | | | |
|---|---|---|---|
| 3,452,328 | 6/1969 | Hsiao et al. | 340/146.1 |
| 3,465,287 | 9/1969 | Kennedy et al. | 340/146.1 |
| 3,475,725 | 10/1969 | Frey | 340/146.1 |
| 3,560,924 | 2/1971 | McBride | 340/146.1 |
| 3,562,711 | 2/1971 | Davis et al. | 340/146.1 |
| 3,573,726 | 4/1971 | Towell | 340/146.1 |

OTHER PUBLICATIONS

M. Y. Hsiao et al., " Serial- to- Parallel Transformation of Linear- Feedback Shift Register Circuits," IEEE Transactions on Electronic Computers, Dec. 1964, pp. 738- 740.

*Primary Examiner*—Paul J. Henon
*Assistant Examiner*—Ronald F. Chapuran
*Attorney*—Hanifin and Jancin

[57] ABSTRACT

Described is a universal cyclic division circuit for developing cyclic redundancy checks upon data wherein the circuitry may be utilized for more than one character size and for more than one polynomial. The system employs a storage device which contains information as to the character size in use as well as storage for the polynomial being used for checking data transmissions over a given communications channel. This information is used to control a universal matrix which uses the stored polynomial to generate the proper cyclic redundancy check character for the new data received and combines it with the cumulative cyclic redundancy check character developed by the matrix for previous characters. Upon the completion of a data transmission, the cyclic redundancy check character developed by the matrix should be identical to the cyclic redundancy check character developed in the transmitter if an error free transmission and reception has occurred.

7 Claims, 8 Drawing Figures

INVENTORS
RICHARD B. FREEMAN
MICHAEL T. KAWALEC
ANDREW W. MAHOLICK
STANLEY R. STAGER, III

BY John D. Crane
AGENT

| 1 | 2 | 3 | OUT |
|---|---|---|---|
| + | + | + | + |
| + | + | − | − |
| + | − | + | + |
| + | − | − | − |
| − | + | + | + |
| − | + | − | − |
| − | − | + | − |
| − | − | − | + |

| 1 | 2 | OUT |
|---|---|---|
| + | + | + |
| + | − | + |
| − | + | + |
| − | − | − |

UNIVERSAL CYCLIC DIVISION CIRCUIT

BACKGROUND OF THE INVENTION

This invention relates generally to a universal cyclic division circuit for the generation of cyclic redundancy check remainders upon data transmitted over some data communications link.

More particularly, the invention relates to an apparatus capable of dividing received data upon a data communications channel by many different polynomials to produce a cyclic redundancy check character.

DESCRIPTION OF THE PRIOR ART

The prior art shows that cyclic redundancy coding is a relatively old technique for use in error detection. For example, W. W. Peterson and D. T. Brown wrote a fundamental paper entitled "Cyclic Codes for Error Detection" in the Proceedings of the IRE, January 1961 at page 228. This particular article pointed out the great potentialities for cyclic codes in error detection and the requirements for implementing such error detection systems. A second discussion of a similar nature is found in the article entitled "Serial-to-Parallel Transformation of Linear-Feedback Shift-Register Circuits" by M. Y. Hsiao and K. Y. Sih which is found in the IEEE Transactions on Electronic Computers, December 1964 at page 738.

The above-identified articles in the prior art emphasize fixed wiring patterns in the hardware used to implement the error detection capabilities of cyclic redundancy codes. These hardware embodiments would require a complete rewiring internally if it were desired to change the polynomial for which the cyclic redundancy check was to be generated. This, in turn, would mean that the circuitry itself would have a limited usefulness because only one type of polynomial could be used within a system at any one time.

Because the prior art devices are operable only upon a single polynomial, it is a primary object of this invention to produce a cyclic redundancy check device which is capable of operating upon data with the use of any checking polynomial of a given length.

It is another object of this invention to utilize the cyclic redundancy check hardware upon more than one class of data which might be transmitted in conjunction with a polynomial which might be different for each class of data.

It is a further object of this invention to be able to multiplex the cyclic redundancy check hardware amongst a plurality of operational transmission devices.

SUMMARY OF THE INVENTION

In order to accomplish the above-defined objectives of this invention, the system employs a memory device which is addressable through the use of a unit address which indicates the actual device communicating over the interface. The unit address is used to address the memory device so as to be able to fetch the polynomial used in conjunction with the given unit address as well as the cyclic redundancy check character (CRC) which has been developed from the data previously received. Upon the receipt of a new character of data on the interface, the data character, the old cyclic redundancy check remainder from the memory and the polynomial from the memory are all gated to the inputs to an array calculator. The array calculator uses this input data to calculate a new cyclic redundancy check remainder which considers the polynomial, the old cyclic redundancy check remainder and the new data character in the generation of the new cyclic redundancy check remainder. The array calculator performs the same functions as the feedback type cyclic redundancy check remainder generating devices of the prior art. Upon completion of the calculation of the new cyclic redundancy check value, the new CRC is transmitted to the main memory in accordance with the unit address. Since the next character received on the interface may be from a different device, a new unit address is transmitted over the interface so as to insure that the proper old CRC and the proper polynomial are combined with the new character.

The above-identified and other objects and features of the present invention will become more apparent from the following detailed description, to be read in view of the drawings.

DESCRIPTION OF THE PREFERRED EMBODIMENT

Figure 1:
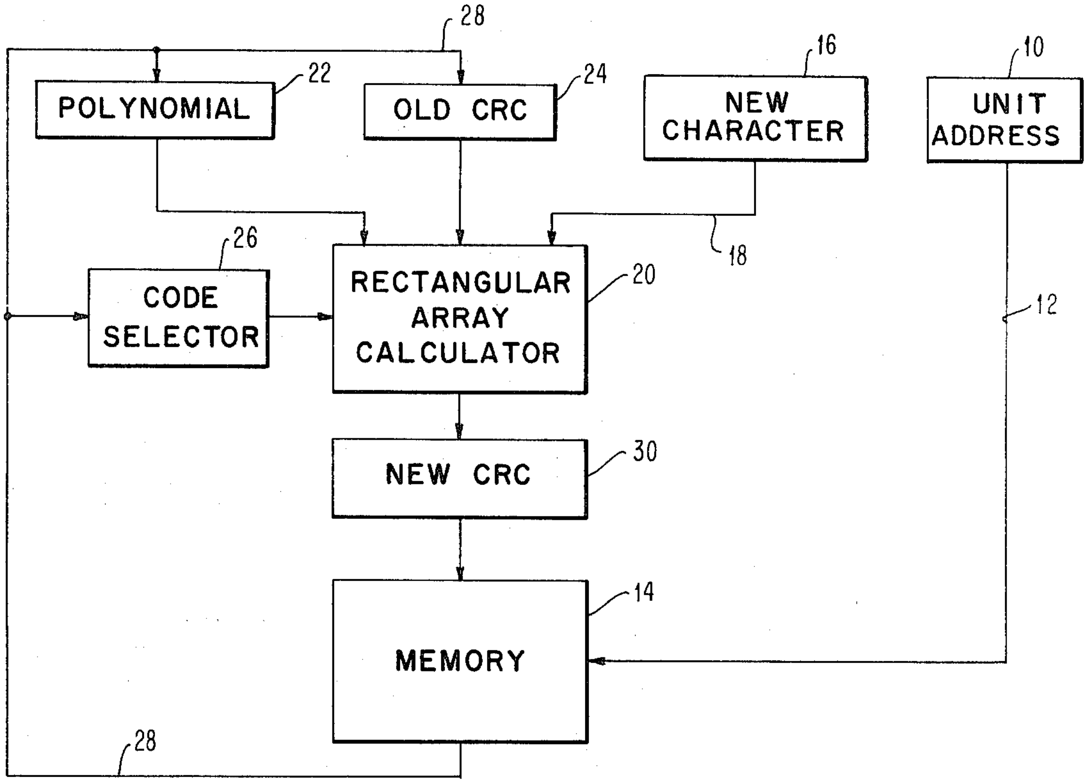
FIG. 1 shows a schematic diagram of the overall system.

Referring now to FIG. 1, a unit address is shown in unit address register 10. This unit address is received from an external communication adapter and is a unique indication to the cyclic redundancy check system to identify the specific communications device for which a cyclic redundancy check is to be calculated. A data bus 12 is connected to the unit address register 10 for transmitting the unit address from the unit address register 10 to the memory 14. The unit address is used by memory 14 to access memory locations which contain certain information necessary for the calculation of the cyclic redundancy check (CRC). Memory element 14 might typically comprise a core storage device, a disk file storage device, a magnetic tape drive storage device, or an all transistorized storage device. All these storage devices are typical of those found within present day computer devices.

At the same time that a unit address is made available to the cyclic redundancy check circuitry, a new data character is also made available to the system and is stored within the new character register 16. The data is stored in new character register 16 right justified with zeroes in the left most bit positions when required. The system is required to calculate a new cyclic redundancy check remainder considering the binary bits contained within the new character.

Subsequent to the receipt of the new address and its transmission via data bus 12 to memory 14, the output of memory 14 is gated onto data bus 28 to the code selector 26, the polynomial register 22 and the old cyclic redundancy check (CRC) register 24. The unit address is utilized to access specific memory locations within memory element 14 such that the polynomial used in generating the cyclic redundancy check for the given data transmission line is fetched from memory element 14 and transmitted via data bus 28 to the polynomial register 22. At the same time, the old cyclic redundancy check remainder is fetched from memory 14 and transmitted via a different portion of data bus 28 to the old CRC register 24. The old CRC is the cyclic redundancy check term calculated for the previous data characters received on the data transmission line indicated by the unit address.

Control information is also transmitted from memory 14 via a portion of the data bus 28 to code selector 26. Code selector 26 is a hardware apparatus which senses data bits on the data bus 28 to determine the characteristics of the data word which is stored in new character register 16. For example, it might be typical that a new character received in new character register 16 might have 6, 7, or 8 data bits within a character. The code selector would sense the data bits upon data bus 28 and set a register according to the sensed data bits. The sensed data bits could be a specific data field in the data word or could be derived from the polynomial word. The latter is possible because certain polynomials imply the use of certain codes for data transmissions. The register set would indicate the number of data bits in the new data character and would transmit this information to the array calculator 20.

Polynomial register 22 and old CRC register 24 also have data busses connected thereto for transmitting the polynomial and the old CRC to the input of the rectangular array calculator 20. Rectangular array calculator 20 is an asynchronous device which will continually calculate a cyclic redundancy check upon the data contained within the polynomial register 22, the old CRC register 24 and the new character register 16 considering the data supplied by code selector 26. The output of the array calculator, after a sufficient amount of time to account for propagation delays within the array calculator, comprises the new CRC and is stored in the new CRC register 30. The new CRC contained in new CRC register 30 is transmitted to memory element 14 and is stored within memory element 14 at the same location as the old CRC was previously stored.

The cyclic redundancy check system of FIG. 1 will continually operate in a manner above-described for a plurality of data transmission lines. In order to determine whether there has been a data transmission error, many approaches might be used. A stop character may be transmitted in the data message which can be decoded by the system. The transmitting device can then transmit characters which would represent the value of the cyclic redundancy check remainder which should exist within the receiving system at the time of transmission of the cyclic redundancy check remainder. This redundancy check would require the comparison of the stored cyclic redundancy check remainder and the transmitted cyclic redundancy check remainder.

A second approach would be to transmit the cyclic redundancy check following the stop character and allow the cyclic redundancy check and the stop character to pass through the universal cyclic redundancy check generator apparatus of the present invention. The result of this operation would be a data word as an output from the array calculator which contained all zeroes under conditions where the data transmission was error free. If the data transmission were not error free the output of the array calculator would not be zero.

A further approach is to transmit the CRC from the transmitter and allow the CRC to be treated as data. After the receiver generates the new CRC at the receiving end, it could be checked against a predictable non-zero result.

Figures 2, 2A:
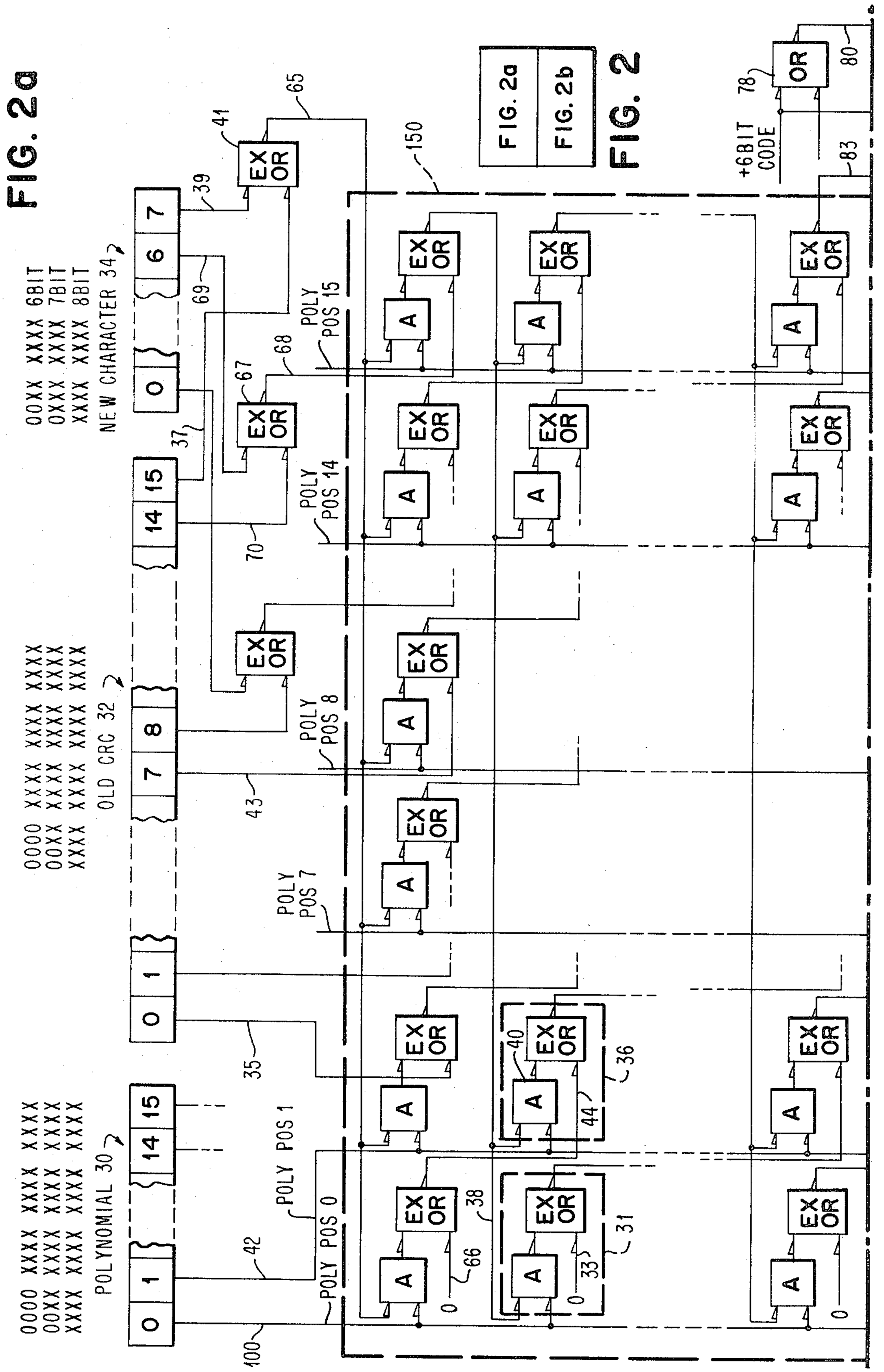
FIG. 2 shows how FIGS. 2*a* and 2*b* fit together.
FIGS. 2*a* and 2*b* show a detailed drawing of the array calculating means shown in FIG. 1.

Referring now to FIGS. *2a* and *2b*, a detailed drawing is shown which includes a major portion of the rectangular array calculator 20 of FIG. 1. The two drawings, FIGS. *2a* and *2b*, should appear together as shown in FIG. 2. The polynomial register 30 of FIG. *2a* corresponds to the polynomial register 22 of FIG. 1 and is a register shown in FIG. *2a* having 16 bit positions which are labeled from 0 through 15. Likewise, old CRC register 32 of FIG. *2a* corresponds to the old CRC register 24 of FIG. 1. Old CRC register 32 contains 16 bit positions which are labeled from 0 to 15. The new character register 34 in FIG. *2a* also has a counterpart in the new character register 16 of FIG. 1.

Each of the above-identified registers in FIG. *2a* are always filled from data busses entering these registers in such a manner that the right most binary bit positions in each of those registers represent data corresponding to the particular polynomial, the old CRC or the new character which is being operated upon at a given time. In cases where this data does not fill the entire register, the higher order or left most bit positions are filled in by external hardware and forced to a binary 0 condition.

Figure 3:
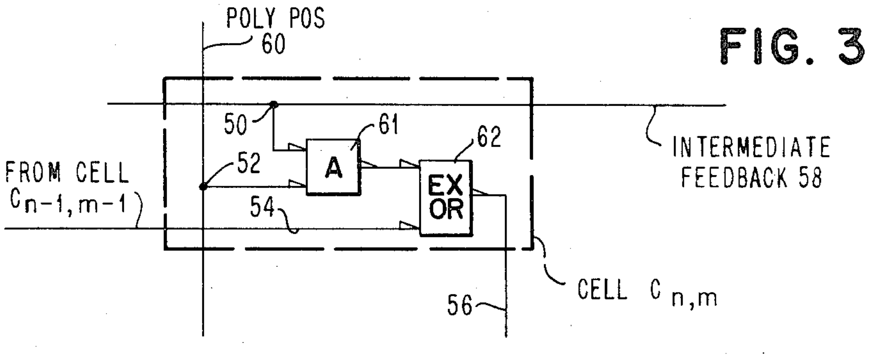
FIG. 3 shows a typical cell element.

Referring briefly now to FIG. 3, a typical cell of the array calculator is shown. The cell is shown enclosed in the dotted line labeled cell $C_{n,m}$. Each cell element has three inputs, a first input 50, a second input 52, and a third input 54. For most of the cell elements within the array calculator, the first input 50 is connected to a line 58 which has signals upon it representing the binary value for the intermediate feedback within the array calculator. The second input 52 is connected to a line 60 which has binary information upon it which represents the binary value of a given single bit position within the polynomial and is connected directly to the polynomial register. A third input line 54 is shown which is a connection to a cell in the array which is diagonally upward to the left in the array. Specifically, cell $C_{n,m}$ has its third input connected to the output of cell $C_{n-1,\ m-1}$.

As can be seen from FIG. 3, the first input 50 and the second input 52 to the cell element $C_{n,m}$, where *n* stands for the row number and *m* stands for the column number, is wired to AND circuit 61. The output of AND circuit 61 is wired directly to one input of EXCLUSIVE OR circuit 62. The other input for EXCLUSIVE OR 62 is connected via line 54 to the output of the cell element diagonally upward and to the left from the particular cell element in which the EXCLUSIVE OR circuit is found. The output of EXCLUSIVE OR circuit 62 within the cell element $C_{n,m}$ is placed upon line 56 either as a binary output value or as an input to another cell element in the array.

Referring again to FIG. *2a*, a typical cell element is shown within the dotted lines 36. The intermediate feedback line 38 is shown connected to one input of the AND circuit 40 within the dotted line 36. The second input to AND circuit 40 is connected to line 42 which comes from polynomial register 30 bit position 1. The third input is connected via line 44 to the output of the cell elements diagonally upward to the left from the cell element shown within the dotted line 36.

A slightly different cell element is shown within the dotted line 31 in FIG. *2a*. This particular cell has the same structure as that within dotted line 36, however, the third input to the cell is wired permanently to a voltage source which provides a data input to that line having a binary value of 0 thereon. Within the dotted line 31, input line 33 is connected to a source which provides a binary 0 value for the input line 33. It should be noted that all of the cells in the first column of the array shown in FIGS. *2a* and *2b* have a binary 0 input applied to the third input of the cells.

The cell elements along the first row of the array in FIG. *2a*, those elements connected to intermediate feedback line 65, have a slightly different characteristic than the other cells of the array because the third input to each cell cannot be connected to the cell element diagonally upward to the left within the array as no such element exists for those within the first row. For cell element $C_{0,0}$, the cell element row 0 and column 0, the third input 66 is wired to a source which provides signals having a binary 0 placed thereon. For cell element $C_{0,1}$, the cell element in row 0 and column 1, the third input is connected via wire 35 to bit position 0 of old CRC register 32. Subsequent cells in row 0 have their third input connected directly to old CRC register 32 up to and including cell $C_{0,7}$.

For cells $C_{0,8}$ to cell $C_{0,15}$, the third input to each cell is wired in a different manner than for the other cells within the row. Cell $C_{0,15}$ provides a good example. The third input to this cell is connected via wire 68 to EXCLUSIVE OR circuit 67. The inputs to EXCLUSIVE OR 67 are connected via line 69 to bit position 6 of new character register 34 and via line 70 to bit position 14 of old CRC register 32. Similar wiring exists for the other array elements $C_{0,8}$ through $C_{0,14}$.

The intermediate feedback line 65 is connected to the first input to each of the cell elements in row 0. Intermediate feedback line 65 is generated by EXCLUSIVE OR CIRCUIT 41. The inputs to EXCLUSIVE OR circuit 41 are connected via line 39 to bit position 7 of new character register 34 via line 37 to bit position 15 of old CRC register 32.

In order to facilitate the drawing of the array circuitry, three rows of the array calculator have not been shown in FIGS. *2a* and *2b*. The circuitry of these rows not shown are identical to that of the second row of the array calculator and are wired into the system in a similar fashion.

Figure 2B:
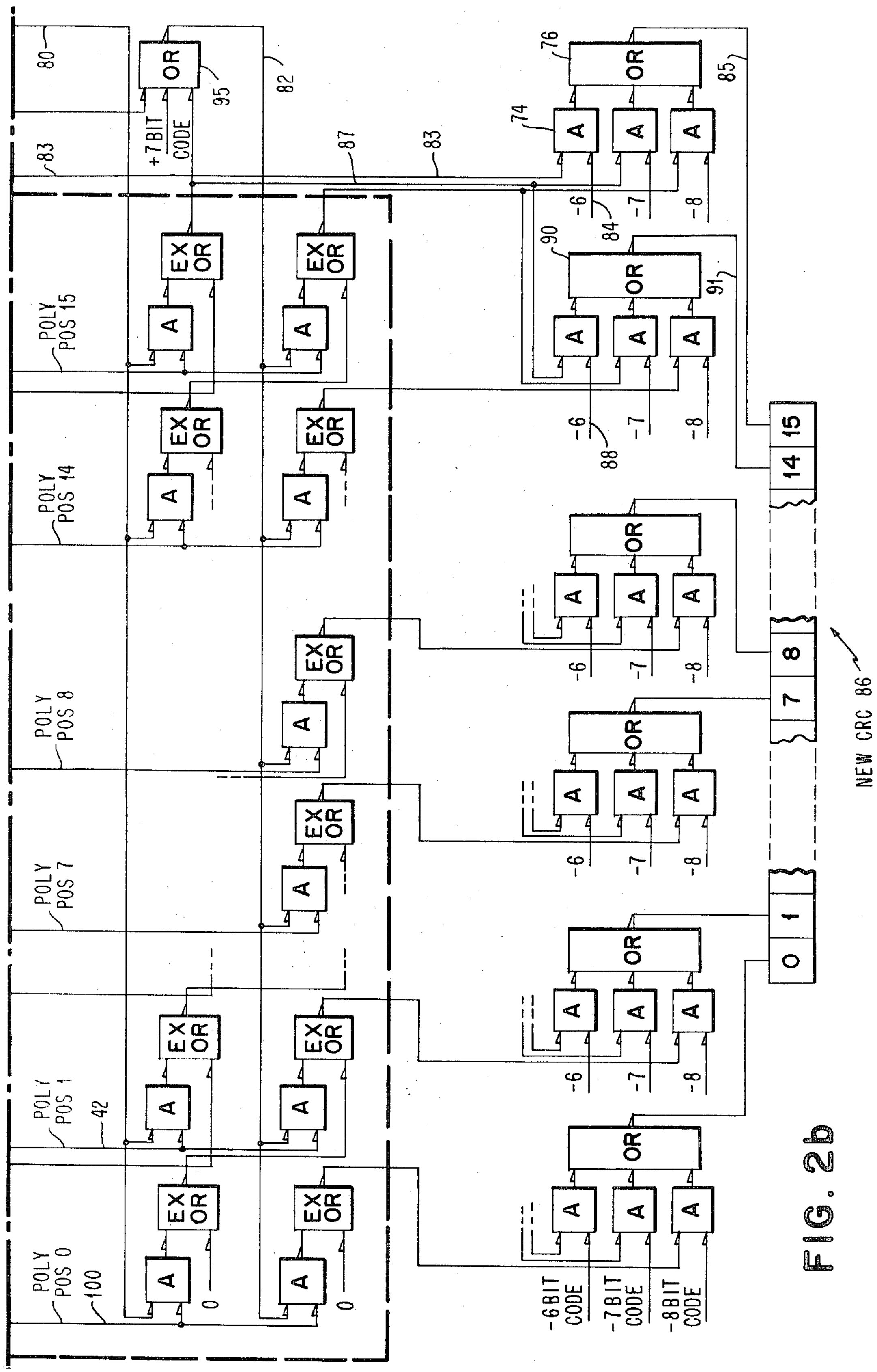

The output of the array calculator must be taken from the proper cells within the array and this is dependent upon the particular bit length of the character for which the cyclic redundancy check is being calculated. For example, should the character upon which the CRC is being calculated be of a length of only six binary bit positions, the output should be taken from the output of the row number 5, (the first row being identified by a 0). This is accomplished through various circuit elements within the array calculator as shown in FIG. 2*b*. Specifically, OR circuit 78 is activated by a signal indicating that the new character is of a 6 bit code type. This signal then propagates along intermediate feedback line 80 and intermediate feedback 82 so as to disable the AND circuits connected thereto in each of the cell elements in rows 6 and 7. As a consequence, the cell elements in RA9-70-003 rows 6 and 7 will not modify the data received from the outputs of the cell elements within row number 5 and they can be used to propagate the output from the cell elements in row 5. The output of cell $C_{5,15}$ is propagated via wire 83 to AND circuit 74. When a negative voltage appears on line 84, the second input to AND circuit 74, the data appearing on line 83 would be transmitted via AND circuit 74 to OR circuit 76 and on to output line 85. This circuitry has the effect of gating the data from line 83 to line 85 unchanged. From line 85, the data is transmitted to bit position 15 of new CRC register 86.

Bit position 14 of the output is gated from cell element $C_{6,15}$ via line 87 to AND circuit 89 when a 6 bit code is indicated by a negative signal on line 88. AND circuit 89 has an output connected to OR circuit 90 whose output is connected to line 91. When line 88 has a negative signal thereon, AND circuit 89 and OR circuit 90 have the effect of transmitting the data from line 87 to line 91 unchanged. Line 91 is connected to bit position 14 of new CRC register 86.

Cell element $C_{7,15}$ provides an output which is gated by gating circuit not shown to bit position 13 of new CRC register 86 when a 6 bit code is being operated upon. The other bit positions of new CRC register 86 would be filled from data from cell elements in row 7 of the array in a similar manner to that described for bit position 13 in new CRC register 86 when a 6 bit code was being transmitted. In the case where the new character contains 8 data bits, each of the outputs of the eighth row of the array calculator would be connected directly to new CRC register 86 via appropriate switching circuits and no compensation for the shift in the array network would be necessary.

Figure 4:
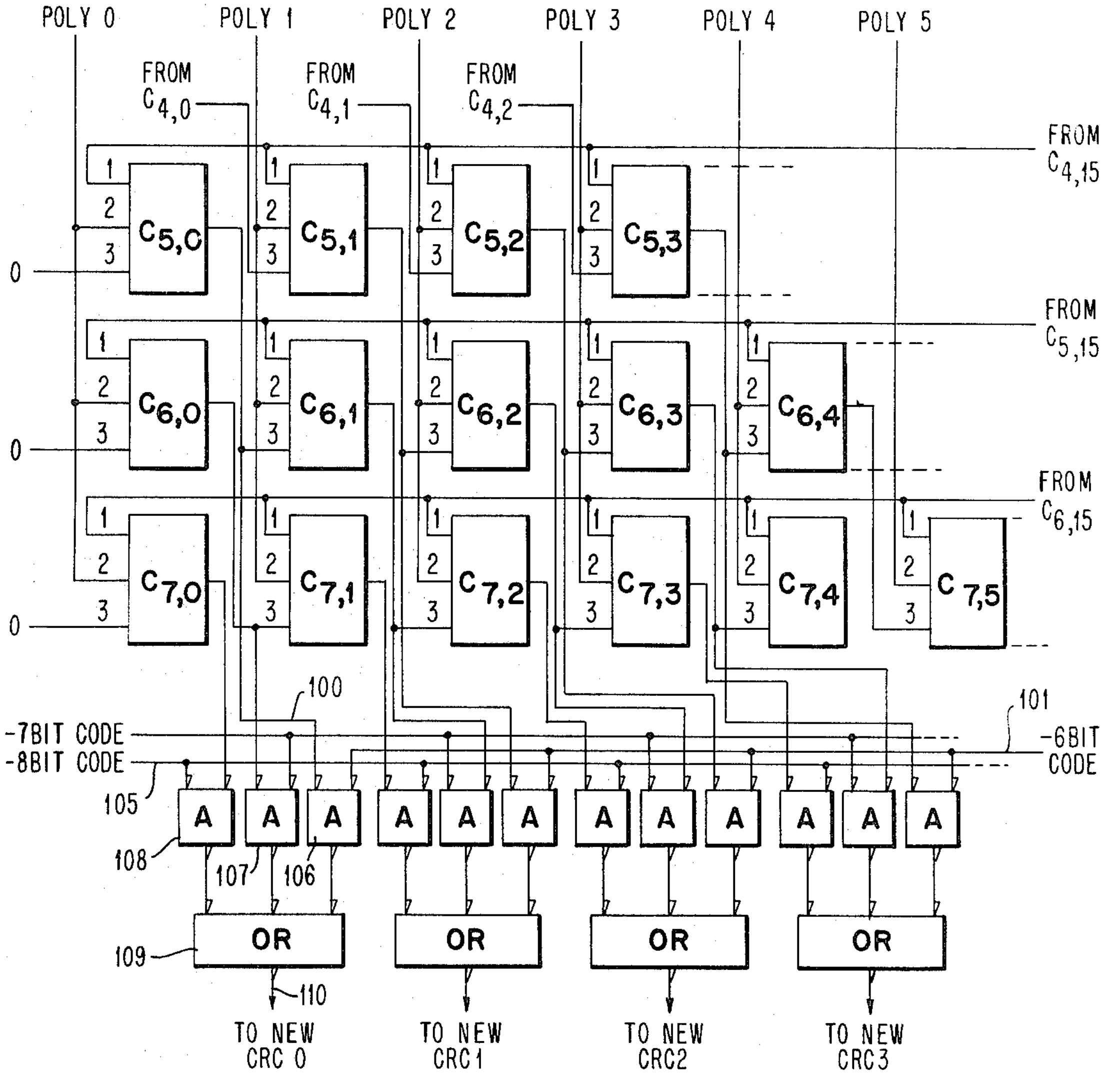
FIG. 4 shows the lower left portion of the array calculator and the alternate output gating.

The gating circuitry above-mentioned in connection with FIG. 2 is particularly adapted to monolithic circuitry because the output gating occurs from elements of the network which are on the peripheries of the rectangular array calculator. In both FIGS. 2*a* and 2*b*, the circuitry enclosed within dotted line 150 could easily be placed in a single chip and all wiring connections can be made to points within dotted line 150 without crossing any internal connections. The advantage to the above-shown output gating is that additional wires from the outside of the array are not necessary to connect to interior points within the array. Where such wiring problems do not exist, a simpler approach to the outputting is shown in FIG. 4. The individual cell elements as shown in FIG. 4 are shown as rectangular blocks and their position in the array is indicated by a symbol inside the block which is of the form $C_{i,j}$ where $i$ represents the number of the row in which the cell element occurs and $j$ represents the number of the column where the cell element is found.

Looking specifically now to the cell elements $C_{5,0}$, $C_{6,0}$ and $C_{7,0}$, these cell elements correspond to the cells from which the data bit for the new CRC bit position 0 would be generated. It should be noted that OR circuits 78 and 95 as shown in FIG. 2 would not be included in the circuitry of the array calculator when the output gating is of the nature as shown in FIG. 4. These OR circuits of FIG. 2 would be replaced by wires in the circuitry of FIG. 4.

The output of cell element $C_{5,0}$ is gated via line 100 to AND circuit 106. When line 101 has a negative signal on it, a 6 bit code is indicated and the AND circuit 106 will be activated so as to transmit the data from line 100 to OR circuit 109. The output of OR circuit 109 is placed on line 110 and transmitted to the new CRC register bit position 0. With a negative signal on line 101, the data contained on line 100 passes through AND circuit 106 and OR circuit 109 unchanged and appears on line 110 for transmission to the CRC register.

In the case where a 7 bit code is indicated, the indication comes from the code selector 26 of FIG. 1, a negative signal would appear on line 103. The data from cell element $C_{6,0}$ is the data information which should be transmitted to the new CRC register bit position 0 when a 7 bit code is transmitted. The data bit from that cell element is transmitted via line 102 to AND circuit 107. With a negative signal appearing on line 103 AND circuit 107 is activated so as to transmit the data from line 102 to OR circuit 109 and then to the output line 110. Again, the data from the proper cell element is passed through AND circuit 107 and OR circuit 109 to the output line 110 which carries the data to the new CRC register position 0.

The output of cell element $C_{7,0}$ represents the data which should be placed in a 0 bit position of the new CRC register when an 8 bit code is being transmitted. In this case, a negative signal would occur on line 105 and activate AND circuit 108 to pass the data from line 104 to OR circuit 109 and then to line 110.

The output gating approach as shown in FIG. 4 is somewhat faster than the circuitry of FIG. 2 because the additional delays of the signal passing through the cell element to reach the peripheries of the array calculator is not necessary because the information is gated from within the array itself. This, of course, is only an advantage when a 6 or 7 bit code is being transmitted. It should recalled, however, that the circuitry of FIG. 4 does have the disadvantage of requiring wires from outside the array to be connected to the cell elements internal to the array. This may present problems of fabrication when using monolithic techniques but would have a negligible effect in discreet component approaches to implementing the array calculator.

Figure 5A:
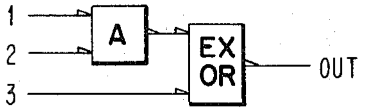
FIGS. 5*a* and 5*b* show the circuitry for the cell elements shown in FIG. 4.
Figure 5B:
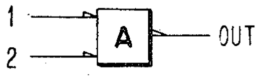

Referring now to FIGS. 5*a* and 5*b*, a typical cell element is shown within FIG. 5*a* which could be placed within any of the cell element blocks of FIG. 4. In the case of the cell elements in the first column, the third input is electrically wired to a source which represents a binary 0 signal. In such a case, it will be clear to those of skill in the art that the cell element regenerated in the first column of the array could be drawn like FIG. 5*b*. That is, the EXCLUSIVE OR element of the circuit in FIG. 5*a* has no useful function and could be easily eliminated.

The apparatus shown in FIG. 2 performs a relatively complicated mathematical function upon the various data inputs to the array. Initially, a modulo two addition or half summing occurs between the old CRC and the new character. This modulo two addition is permormed by the EXCLUSIVE OR elements 67 and 41 for bit positions 6 and 7 of the new character register being added to bit positions 14 and 15 of the old CRC. Additional EXCLUSIVE OR elements are wired in similar fashion to those just mentioned so as to effect the modulo two addition of the old CRC to the new character. The result of that addition is then applied to the array calculator. The array calculator operates in a manner so as to duplicate mathematically the results which might be obtained by the prior art serial feedback approaches to CRC generation.

The circuitry within the array has its various analogies to the serial feedback circuitry of the prior art. For example, the vertical lines such as line 100 in FIG. 2 represents a single feedback point in an analogous serial feedback approach to CRC generation. The horizontal lines or intermediate feedback line, such as line 65 of FIG. 2, represents the state of the feedback network in the serial feedback approach to CRC generation. The concurrence of a feedback path and the proper data bit in the feedback path would cause a change in the data within the serial shifting network. A similar changing of data occurs in the transmission between one cell element and another if the data on the intermediate feedback line and the line from the polynomial register are of the proper values.

While the foregoing drawings and description relate to a particular embodiment of the present invention, it will be recognized by those of skill in the art that many modifications and deviations to the circuitry can easily be made without deviating from the scope and intent of this invention. Specifically, it will be recognized that certain simple modifications may be made to the array calculation device so as to be able to handle new characters of different character lengths than have already been described. It will be apparent to those of skill in the art that the foregoing description and drawings relate to a CRC network where the polynomial used has a maximum degree of 16. It would be possible to expand the degree by expanding the width of the array calculator so as to handle a larger polynomial. It will also be recognized by those of skill in the art that the handling of a larger polynomial would make possible the handling of the generation of cyclic redundancy codes for data characters with more than 8 data bits in each character by increasing the number of rows in the array as necessary.

What is claimed is:

1. A universal cyclic redundancy check generator comprising:
 a first register means for storing the cyclic division polynomial;
 a second register means for storing a previously calculated cyclic redundancy check remainder;
 a third register means for storing the new data remainder for which a new cyclic redundancy check term is to be calculated; and
 a rectangular array calculating means for simultaneously combining the data from said first register means, said second register means and said third register means to simultaneously produce the terms of a new cyclic redundancy check remainder from the polynomial, the old cyclic redundancy check remainder, and the new data character.

2. The universal cyclic redundancy check generator as in claim 1 additionally comprising:
 a storage means responsive to said array calculating means for storing said new cyclic redundancy check remainder for use in subsequent operations of said cyclic redundancy check generator as said previously calculated cyclic redundancy check remainder for each of a plurality of communication channels.

3. The universal cyclic redundancy check generator of claim 2 additionally comprising:
 an address register for storing addresses of external communication devices for which a cyclic redundancy check remainder is to be generated;
 a storage addressing means responsive to said address register for addressing said storage means to access information therein, said information comprising a cyclic division polynomial and a previously calculated cyclic redundancy check remainder; and
 means for transmitting said previously calculated cyclic redundancy check remainder from said storage means to said old cyclic redundancy check register and for transmitting said cyclic division polynomial from said storage means to said polynomial register.

4. A universal cyclic redundancy check generator for generating cyclic redundancy check remainders from transmitted data characters comprising:
 an array of cell elements, each cell element having a first input, a second input, a third input and an output, said cell elements being arranged in *m* columns and *n* rows of elements, each element being identified as cell element $C_{i,j}$ where *i* represents the number of the row and *j* represents the number of the column in which a cell element is located;
 a polynomial register containing *m* binary bit positions, each of said binary bit positions of said polynomial register being wired to the second input of all cell elements in a single unique column in said array of cell element;
 an old cyclic redundancy check register containing *m* binary bit positions;
 a new character register containing no more than *n* binary bit positions;
 a new cyclic redundancy check register containing *m* binary bit positions;
 interconnections connecting the output of each cell element $C_{i,j}$, where *i* has a value between 0 and $n-1$ and *j* has a value between 0 and $m-1$ to the third input to cell element $C_{i+1,\,j+1}$;
 interconnections connecting the output of each cell element $C_{i,m}$ where *i* has a value between 0 and $n-1$ to said first input of the cell elements $C_{i+1,\,j}$ where *j* has a value range from 0 to *m*;
 means for connecting the third input of each cell element $C_{0,j}$ where *j* takes on values from 0 to *n* to a source for placing a binary 0 value upon each of said third inputs of said cell elements $C_{0,j}$;
 a half sum means responsive to said new character register and said old CRC register for generating a half sum;
 an interconnection to place the lowest order bit signal of half sum means upon the intermediate feedback connection which connects all of the first inputs of the cell elements in row 0 of the array of cell elements;
 interconnections for connecting bits 0 through $m-1$ of said half sum to the third inputs of the cell elements $C_{0,1}$ through cell elements $C_{0,m}$; and
 gating means for gating the output of each said cell elements $C_{i,j}$ to said new cyclic redundancy check register where *i* equals the number of bits in the data character in said new character register and *j* takes on all values from 0 to *m*.

5. A universal cyclic redundancy check generator as in claim 4 wherein said cell elements comprise:
 an AND circuit having two inputs and one output;
 an EXCLUSIVE OR circuit having two inputs and one output;
 said first and second inputs to said AND circuits comprising said first and second inputs to said cell element;
 an interconnecting circuit for connecting said output of said AND circuit to one input of said EXCLUSIVE OR circuit;
 the remaining input to said EXCLUSIVE OR circuit comprises said third input to said cell element; and
 said output of said EXCLUSIVE OR element comprises said output of said cell element.

6. A universal cyclic redundancy check generator for generating cyclic redundancy check remainders from transmitted data characters comprising:
 an array of cell elements, each cell element having a first input, a second input, a third input and an output, said cell elements being arranged in *m* columns and *n* rows of elements, each element being identified as cell element $C_{i,j}$ where *i* represents the number of the row and *j* represents the number of the column in which a cell element is located;
 a polynomial register containing m binary bit position, each of said binary bit positions of said polynomial register being wired to the second input of all cell elements in a single unique column in said array of cell element;
 an old cyclic redundancy check register containing *m* binary bit positions;
 a new character register containing no more than *n* binary bit positions;
 a new cyclic redundancy check register containing *m* binary bit positions;
 interconnections connecting the output of each cell element $C_{i,j}$, where *i* has a value between 0 and $n-1$ and *j* has a value between 0 and $m-1$ to the third input to cell element $C_{i+1,\,j+1}$;
 interconnections connecting the output of each cell element $C_{i,m}$, where *i* has a value between 0 and $n-1$ to said first input of the elements $C_{i+1,\,j}$ where *j* has a value range from 0 to *m;*
 means for connecting the third input of each cell element $C_{0,j}$ where *j* takes on values from 0 to *n* to a source for placing a binary 0 value upon each of said third inputs of said cell elements $C_{0,j}$;

n EXCLUSIVE OR circuits, each circuit having two inputs and an output, one input of each of said EXCLUSIVE OR circuits being connected to a single unique binary bit position of said new character register and a second input of each of said EXCLUSIVE OR circuits being connected to a corresponding unique low order bit position of said old cyclic redundancy check register, the outputs of the $n-1$ highest order EXCLUSIVE OR circuits being connected to a single unique third input of said cell elements $C_{i,j}$ where $i$ equals 0 and $j$ takes on values from $m-n$ to $m-1$, the lowest order output of said EXCLUSIVE OR circuits is wired to the first input of each of said cell elements $C_{i,j}$ where $i$ equals 0 and $j$ takes on all values from 0 to $m$;

interconnecting circuits for connecting the highest order bit positions of said old cyclic redundancy check register to corresponding single third inputs of said cell elements $C_{i,j}$ where $i$ equals 0 and $j$ takes on values from 0 to $m-(n-1)$; and gating means for gating the output of each of said cell elements $C_{i,j}$ to said new cyclic redundancy check register where $i$ equals the number of bits in the data character in said new character register and $j$ takes on all values from 0 to $m$.

7. A universal cyclic redundancy check generator as in claim 6 wherein said cell elements comprise:

an AND circuit having two inputs and one output;

an EXCLUSIVE OR circuit having two inputs and one output;

said first and second inputs to said AND circuits comprising said first and second inputs to said cell element;

an interconnecting circuit for connecting said output of said AND circuit to one input of said EXCLUSIVE OR circuit;

the remaining input to said EXCLUSIVE OR circuit comprises said third input to said cell element; and said output of said EXCLUSIVE OR element comprises said output of said cell element.

* * * * *